April 14, 1942.    P. L. STAPLETON    2,279,846
TEMPERATURE MEASURING APPARATUS
Filed Jan. 27, 1940    3 Sheets-Sheet 1
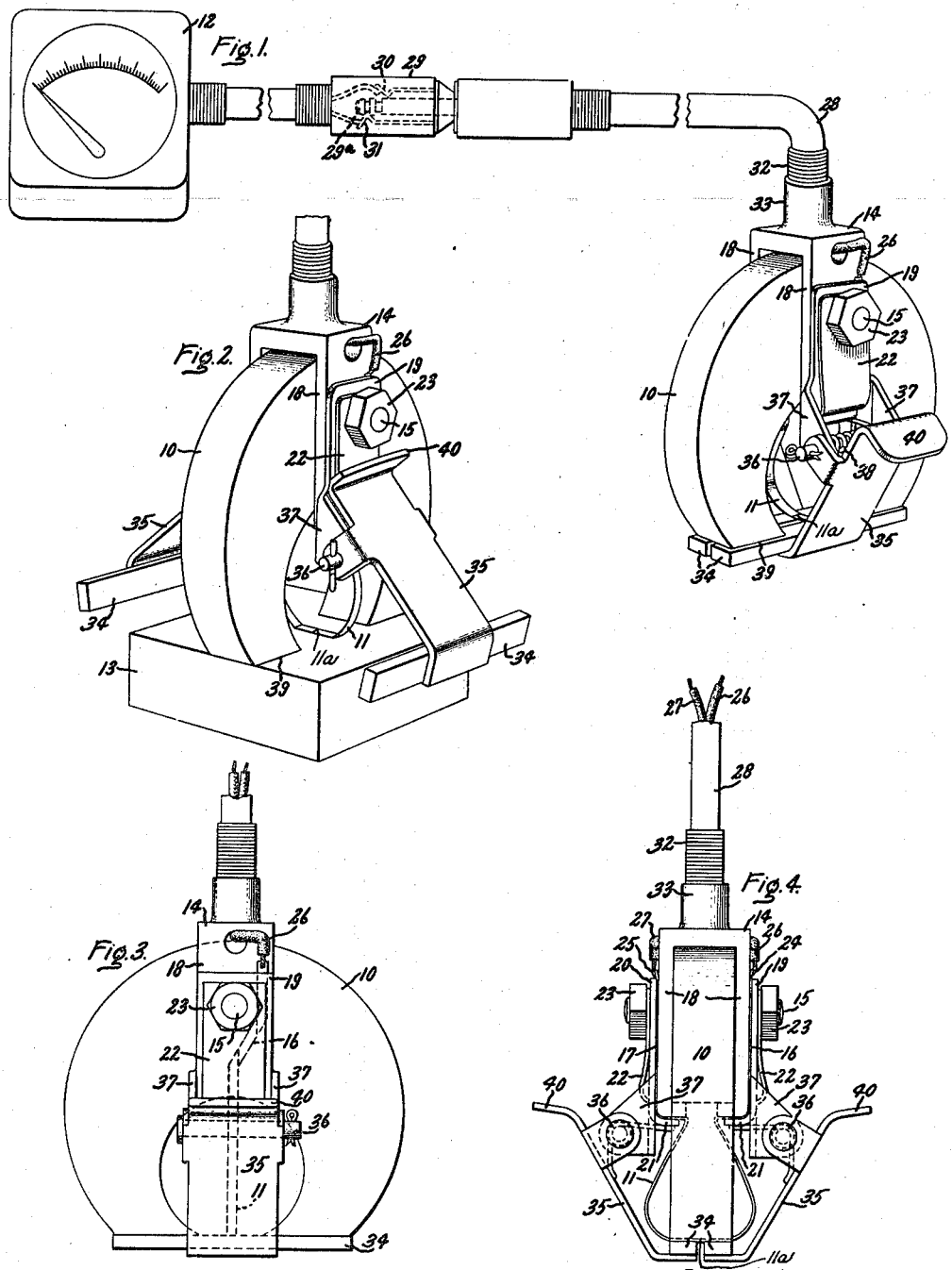
Inventor:
Patrick L. Stapleton,
by Harry E. Dunham
His Attorney.

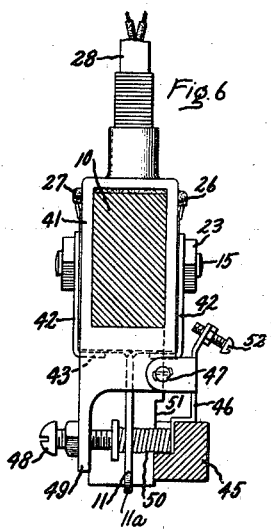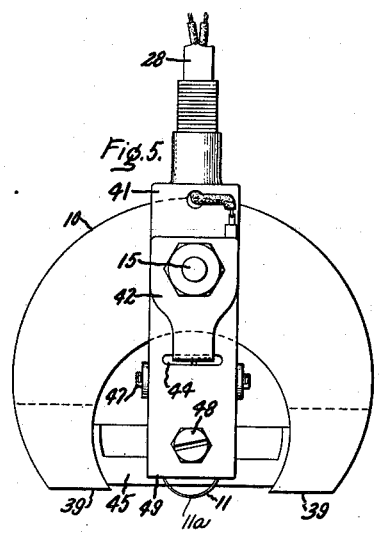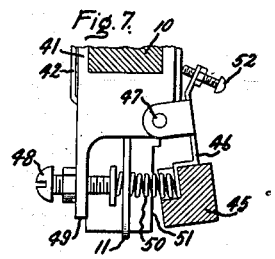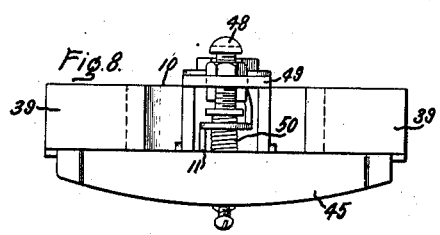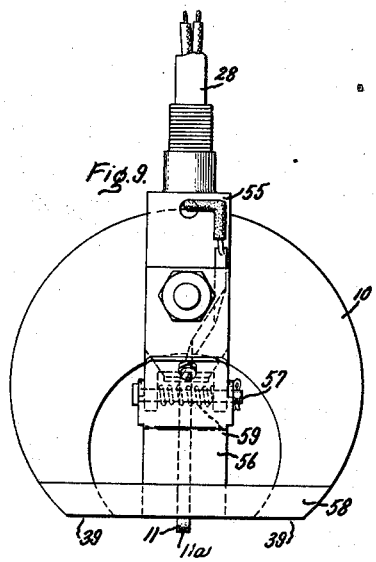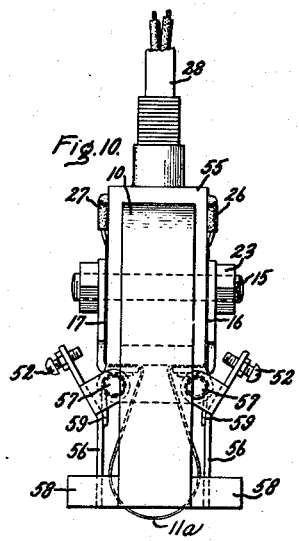
Inventor:
Patrick L. Stapleton,
by Harry E. Dunham
His Attorney.

April 14, 1942.   P. L. STAPLETON   2,279,846
TEMPERATURE MEASURING APPARATUS
Filed Jan. 27, 1940   3 Sheets-Sheet 3
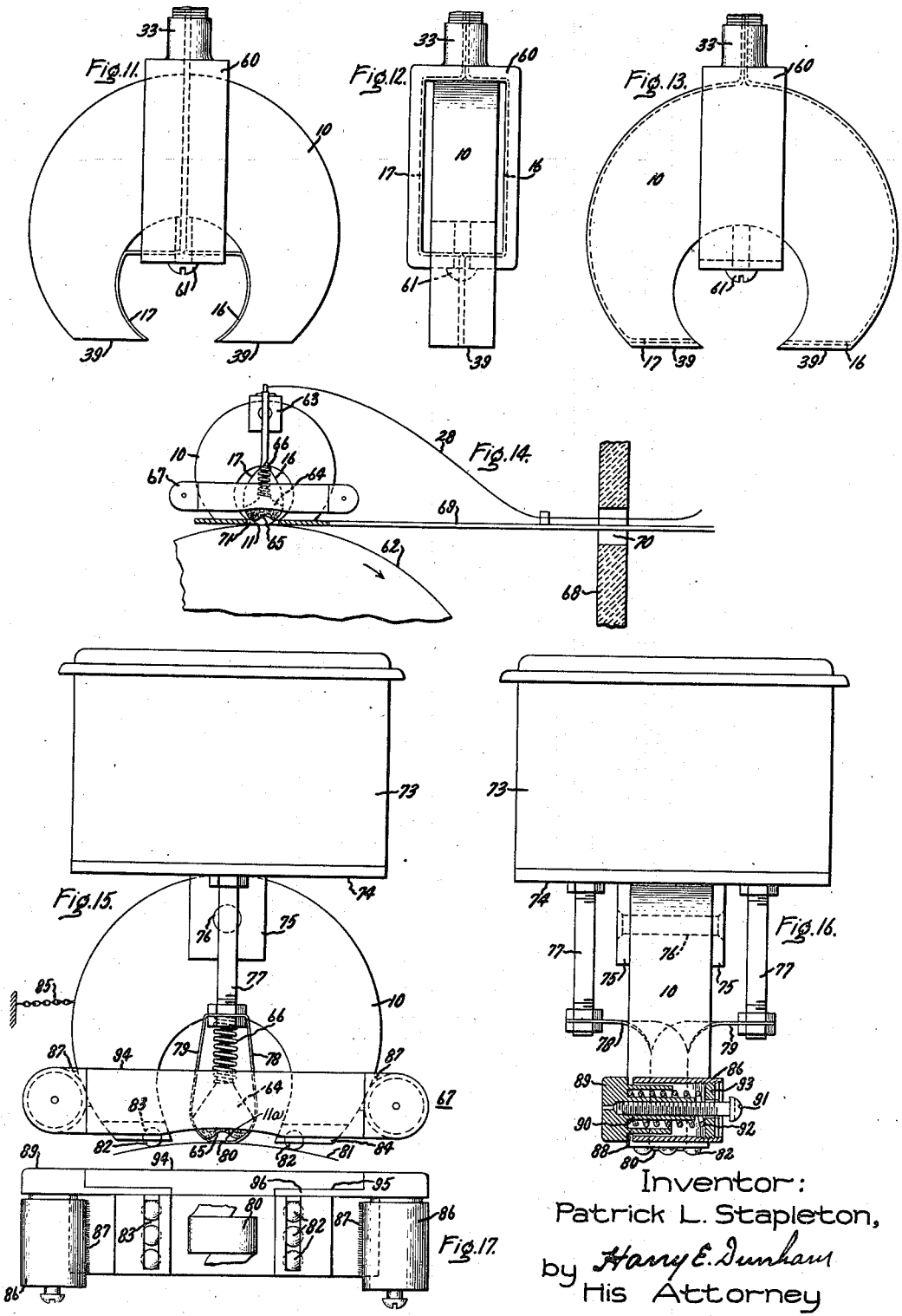
Inventor:
Patrick L. Stapleton,
by Harry E. Dunham
His Attorney Patented Apr. 14, 1942

2,279,846

UNITED STATES PATENT OFFICE 2,279,846

TEMPERATURE MEASURING APPARATUS

Patrick L. Stapleton, Scotia, N. Y., assignor to General Electric Company, a corporation of New York Application January 27, 1940, Serial No. 315,989

9 Claims. (Cl. 136—4)

This invention relates to temperature measuring apparatus and more particularly to pyrometers for measuring the surface temperatures of metallic objects.

It is an object of my invention to provide an improved device for measuring the surface temperature of ferrous metallic bodies.

It is another object of my invention to provide a simple and positive device for maintaining a sensitive temperature responsive device adjacent the surface of magnetic material.

It is a further object of my invention to provide a compact, portable, temperature measuring device in which the temperature responsive element and an electrical indicating instrument are embodied in a single unit and provided with means for maintaining the temperature responsive instrument close to or in contact with an object, the temperature of which is to be measured.

It is another object of my invention to provide a simple arrangement for maintaining a thermocouple element close to or in contact with a plane or curved surface of a stationary or relatively movable ferrous metallic body, the temperature of which is to be measured.

In accordance with my invention in its preferred form, I provide a temperature measuring device comprising a thermocouple element which is secured to a permanent magnet composed of a material having the ability to retain its magnetic properties at temperatures as high as approximately 1000° F. The permanent magnet is employed to hold the thermocouple or temperature sensitive device close to or against ferrous metallic bodies undergoing heat treatment. I provide a suitable keeper element which may be operated manually or automatically to aid in conserving the available magnetic energy of the permanent magnet when the device is not being used for measuring temperatures.

The temperature measuring device of my invention may be provided with an electrical measuring instrument which is secured directly to the permanent magnet element or the electrical instrument which indicates the temperature may be connected to the thermocouple element through a microphone type plug and connector arrangement or other suitable conducting means. Arrangements of the foregoing character are suitable for measuring the temperature of either stationary or relatively movable bodies.

The novel features which are characteristic of my invention are pointed out in the appended claims. My invention, however, will be understood more readily from reference to the following specification when considered in connection with the accompanying drawings in which Figs. 1 to 4 illustrate several views of a temperature measuring device constructed in accordance with my invention and provided with a manual keeper element; Figs. 5 to 8 show a modification in which a single automatic keeper is provided for preserving the strength of the permanent magnet element; Figs. 9 and 10 represent a further modification showing the use of a double automatic keeper arrangement; Figs. 11 to 13 illustrate modifications showing different types of thermocouple elements secured to the permanent magnet; Fig. 14 illustrates a temperature measuring device arranged in accordance with my invention for measuring the surface temperature of a rotating body; Figs. 15 and 16 illustrate an arrangement incorporating the permanent magnet, the thermocouple element and an electrical measuring instrument, as a unitary device, and adapted particularly for measuring the temperature of a stationary or relatively movable plane or curved surface; and Fig. 17 is a partial plan view of the bottom side of the arrangements illustrated in Figs. 15 and 16.

Referring to Figs. 1 to 4 of the drawings, I have illustrated a permanent magnet element 10 of horseshoe shape to which is secured a temperature sensitive element, such as a thermocouple 11, the output terminals of which are shown connected to a temperature indicating device 12. In Fig. 2 the device is shown in position for measuring the surface temperature of a ferrous metallic body 13.

In constructing the permanent magnet element 10, I prefer to employ magnetic materials which are characterized by a high coercive force in order that the magnet may be highly resistant to various de-magnetizing influences. I further desire to have a magnetic material which is capable of retaining its magnetic properties even at elevated temperatures. While I do not intend that my invention shall be limited to the employment of a particular magnetic material, I have found that highly satisfactory results may be obtained by the employment of permanent magnet alloys containing iron, nickel, and aluminum as the basic or essential ingredients: These magnets may be prepared in accordance with the teachings of United States Patents Nos. 1,947,274 and 1,968,569 to Wm. E. Ruder, and 2,027,994 to 2,028,000, inclusive, to Tokuschichi Mishima. Or, if desired, the magnet may be formed by a sintering process as disclosed in United States Patent 2,192,743, dated March 5, 1940, of Goodwin H.

Howe entitled "Sintered permanent magnet," and assigned to the same assignee as the present invention. I have found that magnets composed of such alloys not only exhibit a high coercive force and a fairly high residual induction but in addition they will retain almost maximum magnetic strength even when heated to approximately 1000° F. Other known types of permanent magnet materials would permanently lose their magnetism at a far lower temperature.

The thermocouple element 11, in the arrangement illustrated, comprises a thin flexible sensitive member consisting of two thermocouple strips of dissimilar metals preferably joined together end to end by a welding or soldering process to produce a thermocouple junction 11a. I provide means for securing the thermocouple element in supported relation to the permanent magnet element 10. In accordance with the illustrated embodiment, this means comprises substantially a U-shaped clamp member 14 which is adapted to be positioned over the permanent magnet element and secured thereto by any suitable means such as a bolt member 15. I position the leads 16 and 17 leading from the thermocouple junction in clamped relation between the outer side portions 18 of the member 14 and lug members 19 and 20, respectively. The lug members are preferably provided with inturned lower end portions 21 for maintaining the thermocouple wires firmly in position with respect to the lower portion of the supporting member 14. I may provide a spring clip member 22 for applying a pressure along the lug members 19 and 20 to hold the thermocouple leads firmly in position. The bolt member 15 is preferably threaded and provided with a nut 23 at each end to maintain the parts in fixed relation.

I prefer to compose the member 14, the bolt or stud 15, the nuts 23 and the lugs 19 and 20 of a non-magnetic material, such as aluminum. In the case of the clamp 14 and the lugs 19 and 20, I employ aluminum which has been anodized. By the term "anodized" I mean that these members have a protective insulating film or coat of aluminum oxide on their surfaces which keeps the thermocouple from short circuiting. This coating is very effective as an insulating medium for the small millivoltages generated within the temperature ranges of devices of this character.

The leads 16 and 17 from the thermocouple element may be joined at 24 and 25 by other conducting leads 26 and 27 for connecting the thermocouple element in circuit with a suitable temperature indicating device 12. The conductors 26 and 27 leading to the temperature indicating device 12 are preferably arranged in the form of a cable 28 having a heat-resistant, insulated covering, composed of a suitable material such as asbestos. I preferably employ a readily detachable connector 29, comprising a plug 29a, and contact portions 30 and 31, in the circuit between the temperature indicating device 12 and the leads 26 and 27 to provide convenient means for removing the instrument from and inserting it in the circuit with the thermocouple. I may likewise employ a suitable armor arrangement 32 about the cable 28 at the neck portion 33 of the supporting member 14.

I provide means for preserving as much of the magnetic energy of the magnet 10 as possible when it is not in use. In accordance with the arrangement illustrated, this comprises a plurality of magnetic or soft iron armatures or keeper elements 34 each of which is suspended on an arm or lever 35 for pivotal movement about a pivot pin 36 supported by a pair of ears or offset portions 37 of the lug or clamping members 19 and 20. With this construction the parts 34, 34 which form the keeper element may be moved over the pole faces 39 as shown in Figs. 1, 3 and 4 or they may be moved off the pole faces as shown in Fig. 2. A resilient member such as a spring 38 provides means for moving the keeper elements outwardly to a position where they are substantially ineffective as keepers and for holding the armature elements outwardly in retracted position against the force of gravity, as illustrated in Fig. 2.

In operation, the keeper or armature elements 34, which occupy the position shown in Figs. 1, 3 and 4 when the device is not in use, are removed from the pole faces 39 of the magnet by exerting a force against the opposite end portions 40 of the pivotally mounted arms 35. Once they are removed from the direct influence of the attractive force at the pole faces 39, the armatures 34 will occupy the position shown in Fig. 2 due to the force exerted by the spring 39. The permanent magnet 10 is then positioned with its pole faces 39 in surface engagement with the object 13 whose temperature is to be measured. By means of such an arrangement, the thermocouple surface contact pressure is maintained at a uniform value and true temperatures will be indicated whether or not the magnet 10 is at the same temperature as the work 13.

In Figs. 5 to 8 I have illustrated a modified arrangement in which the permanent magnet element 10 is provided with a single keeper element of the automatic type placed alongside the magnet poles. In this arrangement I provide a supporting member or clamp 41 which, as illustrated in the drawings, is adapted to slide over the end portions 39 of the magnet and is positioned about the central portion by means of a stud or bolt 15. I may make the lug members 42 of slightly different construction from the lug members 19 and 20 already described inasmuch as a different arrangement is employed for supporting the keeper element. The lug members 42 in this instance are likewise provided with inturned end portions, such as 43, each of which extends through a transverse opening 44 in the supporting member 41.

A single keeper element 45 of suitable magnetic material is supported by an arm or lever 46 which is pivotally supported by a pin 47 engaging the lower section or lug portions of the clamp 41. I may provide an adjustable stud or screw 48 in threaded engagement with the lower portion 49 of the clamp or supporting member 41 for furnishing a support against which rests one end of a biasing spring 50 which controls the operation of the keeper element 45. Fig. 8 illustrates a plan view from the underneath side showing the internal arrangement.

In operation, the stud 48 is so adjusted with respect to the spring 50 that when the faces 39 of the permanent magnet are not in contact with the work or an object whose temperature is to be measured, the flux threading the keeper element 45 is sufficient to overcome the adjustable spring pressure and the keeper element is attracted to the poles by the magnetic flux of the magnet. With proper adjustment the keeper remains against the smooth side portions 51 of the magnet poles as illustrated in Fig. 6 until the magnet is placed with its pole faces 39 in contact with the work 13 or body whose temperature is to be measured. When this takes place a portion of the magnetic flux in the keeper 45 is diverted to the body 13 and this allows the spring 50 to push the keeper outwardly and away from the magnet, as illustrated in Fig. 7, thus increasing the reluctance of the magnetic path through the keeper so that most of the flux then passes through the body 13. An adjustable stop member 52 of a suitable material such as brass, is provided to limit the outward travel of the keeper so that when the magnet is removed from the work, the magnetic flux pulls the keeper back in place against the sides of the poles.

The various parts just described are constructed preferably of the same materials as the corresponding elements described in connection with Figs. 1 to 4.

In Figs. 9 and 10 I have illustrated an arrangement which embodies the use of two automatically controlled keeper elements to aid in retaining the magnetism of the permanent magnet. In this arrangement, a clamp or supporting member 55 which is likewise adapted to slide over the ends 39 of the magnet is positioned about the central portion of the magnet 10 and clamped firmly to the magnet by means of a stud or bolt 15. The depending portion 49 as shown in Fig. 6 is dispensed with and a pair of arms 56, 56 are pivotally mounted about pins 57 in much the same manner as the arm 46 of Fig. 6, and supported from the clamp 55. A pair of armature elements or keepers 58, 58 are held to the side of the magnet poles as indicated against the force exerted by the springs 59. When the magnet is positioned against magnetic material such as the work, both keeper elements are forced outwardly as already described in connection with Figs. 6 to 8.

In Figs. 11 and 12 I have shown a modified form of thermocouple element secured to the permanent magnet 10. In this arrangement, I secure each of the thermocouple wires 16 and 17 of dissimilar metals to the magnet by means of a copper metal spray process. The wires are then fixed to an anodized aluminum supporting member 60 which is adapted to slide over the ends 39 of the magnet 10 and which may be fastened firmly to the magnet by means of a stud 61 which engages the inner surface of the magnet.

In Fig. 13 I have illustrated a modification of the arrangement shown in Figs. 11 and 12 wherein the thermocouple wires 16 and 17 are peened in the surface of the outer edge of the magnet and in each of the pole faces 39, respectively. The supporting member 60 is likewise held firmly in position to the magnet by means of a stud 61. It will be appreciated that in constructing the clamp 60 I may employ a material similar to that described in connection with the clamping member 14 of Fig. 1.

In Fig. 14 I have illustrated an arrangement which is particularly suitable for measuring the temperature of moving plane or curved surfaces. The particular illustration shows the device being used for measuring the temperature of a rotating shaft or cylinder 62 while undergoing heat treatment but is also well adapted to the measurement of the temperature of the rolls in a paper calendering machine, and the like. In the illustrated embodiment, the permanent magnet element 10 supports the wires 16 and 17 of a thermocouple element from a member 63 which is clamped about the magnet. I provided a member 64 composed of a suitable material such as asbestos and having a cut-away portion 65 for transmitting the force of a helical spring 66 to position the thermocouple element 11 in thermal relationship with the surface of the body whose temperature is to be measured, as, for example, at a minimum distance from or in engagement with the surface of the curved member 62. By virtue of the cut-away portion 65, the flexible thermocouple element 11 is made to conform to the curved surface in those cases where it is desired to maintain actual surface contact between the member 62 and the temperature responsive element. I provide the permanent magnet 10 with a keeper element 67 which will presently be described in more detail.

The reference character 68 designates a wall of a furnace inside of which might be placed a body such as the rotating shaft 62 which is being subjected to heat treatment. I have illustrated a member in the form of a rigid metal strip 69 which extends through an opening 70 in the furnace and which has a slotted portion 71 for allowing the thermocouple element 11 to be positioned adjacent the surface of the body 62. The inner end of the member 69 is constructed of magnetic material to provide a medium for holding the magnet 10 in position about the slot 71. The leads 16 and 17 of the thermocouple element 11 may be connected to a measuring instrument through the cable 28.

The operation of the device is believed to be clear. The strip member 69 which is supported in any convenient manner maintains the permanent magnet 10 in the position shown to hold the thermocouple element 11 in contact with or a minimum distance from the surface 62, and it will be appreciated that under such conditions the keeper element is automatically movable outwardly and away from the poles of the magnet. The details of the thermocouple are shown in enlarged form in Fig. 15.

In Figs. 15 and 16 I have shown a modified arrangement in which a temperature indicating device 73 is fixedly mounted on the permanent magnet element 10. A suitable arrangement which I may employ for securing the indicating device to the magnet comprises a plate 74 preferably composed of non-magnetic material such as brass and which has two depending members 75 which are shown clamped about the magnet by means of a pin 76. The measuring instrument is provided with a pair of terminals 77 for connecting to the open ends 78 and 79 of a thermocouple element 80. The thermocouple element in this instance is provided with means similar to that described in connection with Fig. 14 for applying a slight pressure to the thermocouple element for maintaining it in firm contact with or close to the surface of a magnetic body 81 the temperature of which is to be measured. In order to adapt the arrangement to the measurement of the temperature of relatively movable surfaces of bodies such as 81 I have provided anti-friction means for reducing the frictional contact between the magnet and the moving surface. In the arrangement illustrated, this comprises a plurality of freely movable balls 82 of steel or other suitable material mounted in a recess 83 formed in each pole face of the magnet 10. In the arrangement illustrated a pole piece 84 of relatively permeable material, such as soft iron, is joined to each of the magnet poles. With this arrangement the recesses 83 may more easily be formed and also the flux relations of the magnet will be improved. This arrangement permits the body 81 to move freely relative to the magnet 10 and the temperature sensitive element 80 is held in firm contact with the surface while the temperature is being measured. The temperature measuring device may be prevented from moving with the body 81 by applying a small restraining force either manually or by means of a flexible linkage system such as 85 secured at one end to the magnet and at the other end to a fixed member. It will be appreciated that this type of support including the balls 82 may also be employed in connection with the arrangement of Fig. 14 thereby making it possible to dispense with the member 69.

An automatically operated keeper element 67, of the character illustrated in connection with Fig. 14, is also provided with the arrangement of Fig. 15. This device, comprising a magnetic armature is adapted for movement toward and away from the poles of the magnet 10 and carries the magnetic flux of the magnet when the latter is not being employed to maintain the temperature sensitive element in the measuring position. In accordance with the illustrated arrangement shown in partial section in Fig. 16, I secure a hollow member 86, in the form of a cylinder, to opposite edges of the magnet 10 and adjacent the magnet poles by welding or brazing the parts together as shown at 87. Loosely positioned for axial movement within the member 86 is the cylindrical portion 88 of a member 89. The member 89 is also provided with an internally threaded stem portion 90, which engages an adjustable stud or pin 91. A helical spring 92 is positioned between an adjustable disc or plug 93 and the member 89 and thus supplies a biasing force tending to push the member 84 away from the magnet. By properly positioning the plug 93 within the shell 86 the force exerted by the spring may be adjusted to the desired value, and by properly positioning the pin 91 within the stem portion 90 the maximum outward movement of the member 89 may be controlled. Positioned between and joined to the two members 89 is an armature member 94 of magnetic material. The armature may conveniently be joined to the members 89 at the surface 95 by a welding or brazing operation. The parts 86, 89, 91 and 93 are preferably composed of a suitable non-magnetic material such as brass, in order that the flux from the magnet may be forced directly from the poles 84 through the magnetic armature 94. It will be observed that the armature 94, even when in the attracted position, is separated from each of the magnet poles by the thin portion 96 of the member 89. By having this non-magnetic spacer element between the armature and the poles, the automatic operation of the armature is improved. When the magnet is positioned in operative relation with the surface 81, the force of the spring 92 causes the keeper element 67 to be moved outwardly from the magnet and the head portion of the pin 91 acts as a stop to limit this outward movement.

In the foregoing arrangements the thermocouple element is always maintained in the same position adjacent the surface of the hot body the temperature of which is to be measured. The term "adjacent" as employed in this specification is intended to be descriptive of those situations where the thermocouple element is positioned either close to the hot body or in actual contact therewith. In some cases, it may be desirable to position the thermocouple element close to the hot body rather than in actual contact therewith in order to avoid local heating action due to friction.

I have thus provided a simple, convenient, durable, and compact temperature measuring device which may be found quite useful in many temperature measuring applications where the range in temperature does not greatly exceed 1000° F. A device of this character has been found to be particularly suited to the measurement of the temperature of materials in the process of manufacture. Also, it is well adapted to making temperature measurements in connection with the welding of turbine bucket blades to alloys in which the thermal characteristics are critical. Furthermore, temperature measurements in connection with mica forming molds, shrink fits, platens in forming presses and the like, present still other useful fields of application. As indicated in connection with the description of certain embodiments of my invention, apparatus of this character is also adapted to the measurement of temperatures of moving bodies having plane or curved surfaces.

In accordance with the provisions of the patent statutes, I have described the principle of operation of my invention together with the apparatus which I now consider to represent the best embodiments thereof, but I desire to have it understood that the apparatus shown is only illustrative and that the invention may be carried out by other means.

What I claim as new and desire to secure by Letters Patent of the United States is:

1. In a temperature measuring device, a permanent magnet element, a thermocouple element, means for securing said thermocouple element to said permanent magnet, whereby the attractive force of said magnet may be employed for positioning said thermocouple adjacent a body the temperature of which is to be measured, and means for biasing said thermocouple element into thermal relationship with the surface of the body.

2. In a device for measuring the temperature of a moving body of magnetic material, a permanent magnet element, a temperature sensitive element, means for securing said temperature sensitive element to said permanent magnet whereby said temperature sensitive element is maintained in a predetermined position adjacent the surface of said moving body, and means for reducing the friction between said moving body and said permanent magnet element.

3. In a temperature measuring device, a temperature sensitive element, means including a permanent magnet for maintaining said temperature sensitive element in a predetermined position relative to a magnetic body the temperature of which is to be measured, and a keeper element for maintaining the magnetic properties of said magnet when said device is not in use for measuring temperature, means for biasing said keeper element to a position in which the keeper element is substantially ineffective whereby said keeper element is automatically retractable from said magnet when the poles of said magnet are positioned in operative relation adjacent said magnetic body and automatically operable to carry the flux of said magnet when said magnet is removed from said body.

4. In a device for measuring temperature, a flexible temperature sensitive element, a permanent magnet, means for securing said temperature sensitive element to said permanent magnet whereby the attractive force of said magnet may be employed to maintain said temperature sensitive element in contact with the surface of said body, said element being sufficiently flexible to conform to the surface of a body whose temperature is to be measured.

5. A portable instrument for measuring the temperature of a body comprising a permanent magnet, a temperature responsive element, means for securing said temperature responsive element to said permanent magnet whereby the attractive force of said magnet may be employed for positioning said element in predetermined relation adjacent said body whose temperature is to be measured, and means carried by said securing means and disposed adjacent said magnet for movement into a position adjacent thereto for conserving the flux in said magnet when said instrument is in the inoperative position.

6. In a temperature measuring device, a permanent magnet element, a thermocouple element having relatively flexible leads joined to form a thermocouple junction, means for securing said thermocouple element to said permanent magnet, whereby the attractive force of said magnet may be employed for positioning said thermocouple adjacent a body the temperature of which is to be measured, means for biasing the thermocouple junction of said thermocouple into contact with the surface of said body, and means interposed between said biasing means and said means for transmitting the biasing force to said junction.

7. In a temperature measuring device, a permanent magnet element, a thermocouple element having relatively flexible leads joined to form a thermocouple junction, means for securing said thermocouple element to said permanent magnet whereby the attractive force of said magnet may be employed for positioning said thermocouple adjacent a body the temperature of which is to be measured, means for biasing the thermocouple junction of said thermocouple into contact with the surface of said body, and means interposed between said biasing means and said means for transmitting the biasing force to said junction and leads, said transmitting means being shaped to cause said junction and said leads to assume the shape of said body.

8. In a temperature measuring device, a permanent magnet element, a thermocouple element having relatively flexible leads, means for securing said thermocouple element to said permanent magnet whereby the attractive force of said magnet may be employed for positioning said thermocouple adjacent a body the temperature of which is to be measured, means for biasing said leads into contact with the surface of said body, and means interposed between said biasing means and said means for transmitting the biasing force to said leads, a portion of said transmitting means being cut away to permit said leads to conform to the shape of the surface of said body.

9. In a temperature measuring device, a temperature sensitive element, means including a permanent magnet for maintaining said temperature sensitive element in a predetermined position relative to a magnetic body the temperature of which is to be measured and a keeper element for maintaining the magnetic properties of said magnet when said device is not in use for measuring temperature, spring means for biasing said keeper element to a position in which said element is substantially ineffective, said spring means being of such strength that when the permanent magnet is out of contact with said body the flux threading the keeper will overcome the spring pressure so that said keeper is attracted to said magnet but when said magnet is adjacent said body the flux is diverted from said keeper whereby said keeper is moved outwardly to the position in which the keeper is substantially ineffective.

PATRICK L. STAPLETON.